United States Patent
Ghiam et al.

(10) Patent No.: US 6,326,081 B1
(45) Date of Patent: Dec. 4, 2001

(54) MASKING FILM AND METHOD FOR PRODUCING SAME

(75) Inventors: Farid F. Ghiam; James Peter DiPoto, both of Terre Haute, IN (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 09/575,499

(22) Filed: May 18, 2000

Related U.S. Application Data

(63) Continuation of application No. 08/938,091, filed on Sep. 26, 1997, now abandoned.

(51) Int. Cl.[7] ............... B32B 15/04; B32B 17/10; B32B 27/36; B32B 27/08; B32B 15/08
(52) U.S. Cl. ............... 428/355 EN; 428/355 RA; 428/441; 428/461; 428/475.8; 428/476.1; 428/483; 428/500; 428/515; 428/518; 428/412
(58) Field of Search ............... 428/343, 355 RA, 428/355 EN, 441, 461, 462, 475.8, 476.1, 483, 515, 517, 518, 519, 500, 412

(56) References Cited

U.S. PATENT DOCUMENTS

| | | | |
|---|---|---|---|
| Re. 32,929 | 5/1989 | Ewing | 428/220 |
| 3,420,679 | 1/1969 | Gifford et al. | 99/171 |
| 3,503,843 | 3/1970 | Williams, Jr. et al. | 526/351 |
| 3,725,121 | 4/1973 | Fournier | 117/122 |
| 3,746,566 | 7/1973 | Hiratsuka | 428/412 |
| 3,776,805 | 12/1973 | Hansen | 428/412 |
| 3,823,032 | 7/1974 | Ukai | 117/172 |
| 3,892,900 | 7/1975 | Shima et al. | 428/40 |
| 3,962,502 | 6/1976 | Rackley | 427/444 |
| 4,189,420 | 2/1980 | Sugimoto et al. | 260/31.6 |
| 4,420,520 | 12/1983 | Jones et al. | 118/504 |

(List continued on next page.)

FOREIGN PATENT DOCUMENTS

| | | |
|---|---|---|
| 311425 | 4/1989 | (EP) . |
| 0434180 | 6/1991 | (EP) . |
| 1458712 | 12/1976 | (GB) . |
| 53-58578 | 5/1978 | (JP) . |
| 61-116541 | 6/1986 | (JP) . |
| WO9621556 | 7/1996 | (WO) . |

OTHER PUBLICATIONS

"Standard Test Methods for Peel Adhesion of Pressure–Sensitive Tape at 180° Angle," ASTM Designation: D 3330–90 (Reapproved 1994).

"Determination of Adhesion Strength by 180° Peel," QETM–46, Issued 8/92, Revised 2/96 (Modified version of ASTM D 3330–90).

"Surface Texture (Surface Roughness, Waviness, and Lay)," ANSI/ASME B46.1–1985 (sponsored & published by The American Society of Mechanical Engineers).

Primary Examiner—D. S. Nakarani
Assistant Examiner—Holly C. Rickman
(74) Attorney, Agent, or Firm—Jenkens & Gilchrist, P.C.

(57) ABSTRACT

An improved masking film provides an adequate level of protection to relatively smooth surfaces by providing an adjustable and controlled level of adhesion between the masking film and the surface to be protected without the use of corona treatment or an adhesive under a variety of production and application conditions. The use of various copolymers, comonomers, and blends and percentages thereof, allows for control of the adhesion level produced between the improved masking film and the substrate surface to be protected. Using the improved masking film of the present invention, the masking film can be customized for a set of production conditions and desire application and will remain removably adhered to the substrate following a heat-loading process such as thermoforming, drape-forming or heat-bending.

19 Claims, 1 Drawing Sheet

U.S. PATENT DOCUMENTS

| | | | |
|---|---|---|---|
| 4,447,485 | 5/1984 | Aritake | 428/144 |
| 4,477,502 | 10/1984 | O'Sullivan | 428/35 |
| 4,699,842 | 10/1987 | Jorgensen et al. | 428/343 |
| 4,720,416 | 1/1988 | Duncan | 428/195 |
| 4,810,574 | 3/1989 | Anher | 428/355 |
| 4,895,760 | 1/1990 | Barger | 428/332 |
| 4,978,436 | 12/1990 | Kelly | 204/165 |
| 5,085,908 | 2/1992 | Sano et al. | 428/40 |
| 5,100,709 * | 3/1992 | Barger et al. | 428/41 |
| 5,112,674 | 5/1992 | German et al. | 428/216 |
| 5,169,900 | 12/1992 | Gudelis | 525/106 |
| 5,445,883 | 8/1995 | Kobayashi et al. | 428/355 |
| 5,660,901 | 8/1997 | Wong | 428/35.7 |
| 5,861,202 * | 1/1999 | Kimura et al. | 428/105 |

* cited by examiner

MASKING FILM AND METHOD FOR PRODUCING SAME

This application is a continuation of Ser. No. 08/938,091 filed Sep. 26, 1997, now abandoned.

INTRODUCTION

The present invention relates to masking films and, more specifically, to a masking film which removably adheres to rigid, relatively smooth-surfaced substrates under a variety of conditions without the need for corona treatment or an adhesive, and a method for producing same.

BACKGROUND OF THE INVENTION

Masking films are used in numerous applications as a protective coating or covering for surfaces, particularly smooth surfaces, such as acrylics, glass, polished or painted metals, glazed ceramics, and other smooth, relatively rigid surfaces. The masking film is applied to the surface to be protected and acts as a physical barrier to prevent scratching, scuffing and marring of the surface. Protection provided by masking films is particularly useful while these surfaces are being printed, transported, or otherwise handled prior to use.

Traditionally, protection for smooth surfaces has been provided via corona treated films and/or adhesive coated masking paper. Corona treated films are films exposed to an electrostatic discharge to increase the adhesion level of the film. This is accomplished through the production of surface oxidation of the film via the electrostatic discharge, increasing the attraction between the nonpolar surface of the film and the polar surface of the material to be protected. Such corona treated films are typically non-embossed and rely on a very narrow window of corona treatment to facilitate enhanced adhesion. However, disadvantages exist with this technique. For example, where too little corona treatment occurs, the masking film will not adhere to the surface to be protected. Conversely, where too much corona treatment occurs, it is common to find the masking film laminating to itself and/or laminating completely to the surface to be protected, at best requiring additional time, effort and costs to completely unwind the masking film and/or remove the masking material from the protected surface, and, at worst, ruining the protected material for its intended end use. Additionally, since corona treated masking films have a relatively high surface coefficient of friction, rigid wrinkles commonly form in the masking film. Such wrinkles are difficult, if not impossible, to remove, thus precluding the film from adequately protecting the surface to be protected and/or permanently distorting the surface to be protected, again ruining it for its intended purpose. Finally, corona treated polyethylene films commonly have numerous large gels and carbon specks associated with them which can produce dimples in, or otherwise mar, the surface to be protected.

Disadvantages are also associated with masking films using an adhesive coated paper. For example, where a masking material requiring an adhesive coating is used, moisture from humidity or elsewhere can permeate the masking material and loosen or completely separate the masking material from the surface to be protected. The tendency for moisture to adversely affect the performance of this type of masking film is increased where heat is required to activate the adhesive coating. Additionally, even where the masking material remains firmly adhered to the surface to be protected until its removal is desired, such removal can require the use of a solvent to remove trace amounts of the adhesive coating. The adhesive residue left behind on the surface is of particular concern where the surface being protected is to be used in a context where sanitary conditions are desired, such as in food industry applications. The use of an adhesive coating also requires the additional steps of applying the adhesive coating to the preformed film, as well as the expense of using, activating and storing one or more adhesives to be used as a coating. Finally, where heat-activated adhesive coatings are used, the time and expense of providing the proper amount of heat to the process to facilitate proper adhesion further complicates the process.

Recent advances in masking film technology have produced improved masking films formed without corona treatment or the use of adhesive coatings, including one side smooth, one side matted ("OSM") masking films. Such OSM films are more fully described in U.S. Pat. Nos. 4,895,760 and 5,100,709, both assigned to Tredegar Industries, Inc., Richmond, Va. These advanced masking films rely upon the tendency for smooth surfaces to adhere to each other to produce an adequate and constant level of adhesion without the need for corona treatment and the use of adhesive coatings. Additionally, the matted side of the OSM films prevents blocking and wrinkling of such films by preventing a measure of intimate contact between the surfaces. Importantly, these improved OSM films avoid the numerous problems associated with the use of corona treatment and adhesives and are stable over time, even when exposed to moisture and ultraviolet light.

Despite the advanced nature of the OSM films, however, it was discovered that the level of adhesion produced by these improved masking films can vary with temperature and other conditions associated with the production and use of such improved films. At times, such conditions can result in a masking film exhibiting either too much or not enough adhesion level for the desired application. In other applications, it can result in the need for heaters to raise the temperature of the film so that proper application and adequate adhesion level are achieved. Moreover, since the level of adhesion produced is primarily a function of the interaction between the smooth surface of the masking film and the smooth surface to be protected, the smoothness of the surface requiring protection is a significant factor. This factor can present difficulties, and masking films of this type are of limited utility, where the surface to be protected is not particularly smooth.

Methods for producing such prior art films are relatively rigid and do not offer flexibility in the recipe for such films, thus producing films incapable of producing a variety of adhesion levels under a variety of production conditions for a variety of applications.

Variable adhesive masking films are now known in the art and are more fully described in U.S. application Ser. No. 08/877,073, now U.S. Pat. No. 6,040,046, assigned to Tredegar Industries, Inc., the entire content and disclosure of which is hereby incorporated herein by reference. Such variable adhesive masking films are based upon polymer/co-polymer additives within the adhesive layer of the masking film.

Thus there remains a need for a polymer/comonomer-based masking film capable of providing an adequate level of protection to merely relatively smooth surfaces by providing a functional, adjustable and controlled level of adhesion between the masking film and the surface to be protected without the use of corona treatment or an adhesive and their associated disadvantages and under a variety of production and application conditions, and a method for producing same.

SUMMARY OF THE INVENTION

In accordance with the present invention there is provided a masking film which adheres to and provides protection for a relatively smooth surface without the need for a separate adhesive layer or corona treatment. Additionally, the improved film is preferably of the OSM type so that blocking and wrinkling of the film are substantially minimized, if not completely eliminated. Moreover, the adhesion produced is not as dependent upon the smoothness of the surface to be protected. Importantly, the level of adhesion produced by the improved OSM film is adjustable so as to accommodate a variety of production and application conditions. For example, the improved masking film of the present invention will provide a functional level of adhesion to uncoated polycarbonates, acrylics and PETG at room or ambient temperature. Accordingly, for virtually any given processing environment, including temperature and line equipment layout, and desired application, the improved masking film of the present invention can provide an adequate level of adhesion to the substrate of interest. The improved masking film of the present invention also remains removably attached to a substrate surface even after the application of post-production heat loading processes, including, but not limited to, thermoforming, drape-forming and heat-bending.

The improved masking film of the present invention comprises a film preferentially having a smooth side, a rough side and, optionally, one or more core layers interposed between the smooth side and the rough side. The monolayer is preferably extruded and the multiple layers are preferably coextruded. The smooth side comprises at least one layer of a thermoplastic film. In use, the smooth side is applied to the relatively smooth surface to be protected. The rough side is also comprised of at least one layer of a thermoplastic film. The rough side is preferably matte embossed, but can be roughened via any suitable means. The rough side prevents the film from contacting as much surface area of itself, or any other surface, preventing blocking and wrinkling of the film. At least one core layer may be interposed between the smooth side and the rough side of the improved masking film and, if present, is also comprised of a thermoplastic film. In the monolayer embodiment, the smooth side and rough side are opposing sides of the single layer of the film.

The level of adhesion produced between the smooth side of the masking film of the present invention and the surface to be protected is adjustable via the introduction of certain copolymers associated with the smooth side of the film. The controlled combination of such polymers/comonomers has the affect of adjusting the level of adhesion produced between the smooth side of the masking film and the surface to be protected by the masking film. The identity, mixture and quantities of these polymers/comonomers are dictated by the conditions (e.g., temperature) under which the masking film will be applied and ultimately used. Thus, for example, the masking film of the present invention can be produced so as to provide a functional and controlled level of adhesion to acrylics at room temperature without subsequent laminating or welding during heat-loading processes, such as thermobending or thermoforming. The level of adhesion can be adjusted to provide adequate levels of adhesion with substrates at a higher temperature.

In other embodiments of the improved masking film of the present invention, a one, two or multilayered masking film is produced which includes certain copolymer capable of adjusting the level of adhesion produced by the film. These films can be blown or cast. Monolayer or coextrusion of multiple layers may be employed. Additionally, in the multilayered embodiment, the layer including the smooth side of the improved masking film of the present invention may be laminated to the layer including the rough side, if desired. The blending of two or more copolymers (or homopolymers) of the smooth side of the masking film is controlled to produce desired tackiness of the resulting masking film.

According to the method of the present invention, the improved masking film is produced by preselecting the one or more primary components comprising the first skin of the improved masking film of the present invention. It is the surface of this first skin layer which will ultimately intimately contact and adhere with the surface of the substrate to be protected. Once selected, the relative percentages of the one or more components is also predetermined so as to produce a functional and controlled level of adhesion force produced under a given set of the substrate's production conditions and environment.

The remaining skin and core layers, if present, are formed of a thermoplastic. The skin and core layers are preferably coextruded to form the improved masking film of the present invention. Due to the preselection of the components and their relative amounts, the resulting masking film is tailored to perform in the given production environments under the given conditions.

BRIEF DESCRIPTION OF THE FIGURES

A more complete understanding of the present invention may be had by reference to the following detailed description when taken in conjunction with the accompanying figures wherein.

DETAILED DESCRIPTION OF FIGURES

Figure 1:
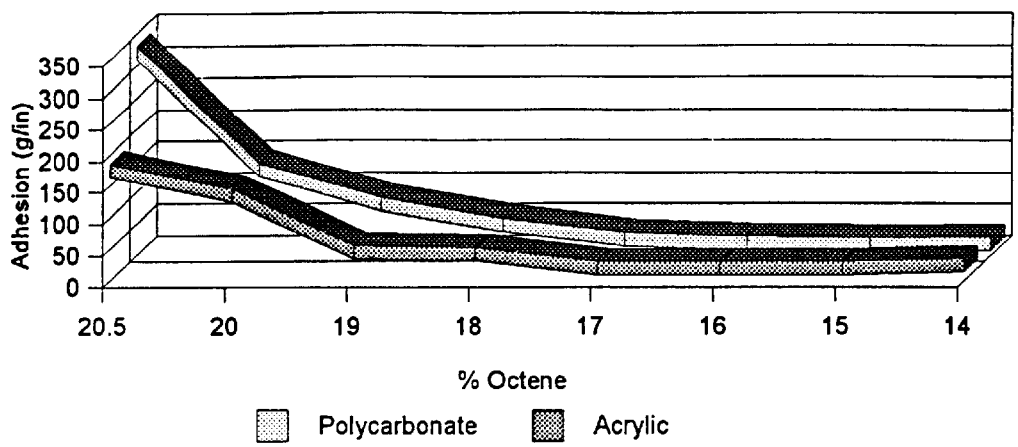
FIG. 1 is a graph depicting peel adhesion values for polycarbonate and acrylic substrates masked at 180° F. and as a function of the percentage of the comonomer component of the masking film.

In a preferred embodiment of the improved masking film of the present invention, a first layer having at least one smooth surface and a second layer having at least one rough surface and, optionally, at least one core layer are coextruded to form an improved masking film. Each of the layers is comprised of a thermoplastic film. Preferred films include metallocene catalyzed polyethylenic films containing octene comonomers, including, but not limited to, DuPont-Dow Engage™ Polyolefin Elastomers (POEs) and Affinity™ Polyolefin Plastomers (POPs), available from DuPont Company or Dow Chemical Company. The thermoplastic films making up the layers of the improved masking film of the present invention also may include films of other polyolefins (homopolymers and copolymers), polyvinyl alcohol, nylon, polyester, polystyrene, polymethylpentene, polyoximethylene, and the like, or blends thereof. Films of polyethylene are particularly suited and therefore preferred and films of low density polyethylene homopolymers are even more particularly suited and therefore more preferred due to their relatively low flexure modulus which tends to conform better to surfaces.

The rough side of the second layer is preferably embossed to produce the desired roughness. The roughness of the second layer is important to prevent blocking and wrinkling of the masking film. The rough surface prevents blocking by precluding such intimate contact between the surfaces of the masking film and another surface such that the masking film can be easily unrolled and/or peeled away from another smooth surface. This feature also prevents the wrinkling so often associated with traditional masking films.

In a preferred embodiment, the first layer includes a surface having a measure of smoothness of from about between 0 Ra and 60 Ra, and more preferably, between 0 Ra and 30 Ra. In a preferred embodiment, the relatively rough surface of the second layer includes a measure of roughness of from between 65 Ra and 600 Ra, and more preferably, between 100 Ra and 300 Ra. For purposes of this application, smoothness and roughness will be defined as the arithmetic average height of the micropeaks and microvalleys of a surface to the center line of such surface as measured by a profilometer. Smoothness and roughness defined in this manner is typically expressed with units of microinches ($10^{-6}$ inches) (Ra). All testing of surface textures (relative smoothness and roughness) were conducted in accordance with ANSI/ASME Test Method B46.1-1985, the entire content of which is incorporated herein by reference. Although measures of smoothness of from about between 0 Ra and 60 Ra are preferred and measures of roughness from about between 65 Ra and 600 Ra are preferred, it is noted that the improved masking film may have virtually any level of relative smoothness or roughness and still prevent much of the blocking and wrinkling associated with traditional masking films. Matte embossing is a preferred technique for imparting a sufficient level of roughness to the second layer. Although matte embossing has been described as a preferred technique by which the second layer is provided with roughness, it should be noted that the roughing of the surface of the second layer may be accomplished via any suitable method or means, if desired.

It is noted that although the preferred embodiment includes at least a first layer and a second layer, the relatively smooth side and the relatively rough side of the improved masking film of the present invention can be formed on opposite sides of a single layer of thermoplastic material, if desired. In such an embodiment, no core layers would be present.

Returning now to the preferred embodiment, fillers added to the second layer will provide certain desired characteristics, including, for illustrative purposes only, roughness, abrasion resistance, printability, writeability, opacity and color. Such fillers are well known in the industry and include, for illustrative purposes only, calcium carbonate (abrasion resistance), mica (printability), titanium dioxide (color and opacity) and silicon dioxide (roughness).

The degree of relative smoothness/roughness desired can be imparted via any suitable means known in the art, including, without limitation, air impingement, air jets, water jets, and combinations thereof In a preferred embodiment, the multiple layers of the improved masking film of the present invention are coextruded using any coextrusion process known in the art. The use of coextrusion allows for the relatively simple and easy manufacture of a multilayered masking film composed of distinct layers, each performing specific functions. Although coextrusion of the improved multilayered masking film of the present invention is preferred, it is again noted that the improved masking film can be monolayered or multilayered and that, regardless of form, the improved masking film can be produced using any other suitable method, if desired.

In use, the relatively smooth surface of the first layer of the improved masking film of the present invention is brought into intimate contact with a relatively smooth surface to be protected. While not wishing to be bound by the following theory, the Applicants believe that the smooth surface of the masking film adheres to the smooth surface of the substrate to be protected through intimate contact via the natural blocking adhesion which exists between a very smooth surface and another smooth surface via polar bonding, ionic bonding and, in some instances, hydrogen bonding, and/or Van der Waals secondary bonding. Preferred substrates for such surfaces include, by way of illustration only, polycarbonates, acrylics, PET, PETG, glass, ceramics and metals.

While the foregoing theory also applies to prior art OSM type films, it has been discovered that the relative smoothness/roughness of the smooth side of the improved film of the present invention plays a less important role in the production of adhesion, thus allowing the improved masking film of the present invention to be used under a wider variety of conditions (e.g., temperature at the time the masking film is applied). Generally, it has been discovered that the relative smoothness of the smooth side of film will be of greater importance where application temperatures during the masking process are lower. Conversely, the higher the application temperature, the less important a role the relative smoothness plays.

Any one or more of a number of conventional application methods can be used to bring the smooth side of the first layer of the improved masking film into intimate contact with the smooth surface of the substrate to be protected by the masking film. Typically, the improved masking film will be applied to the surface to be protected via a nip roll or similar system through which the multilayered film and the substrate surface to be protected are passed simultaneously. If desired, the resulting article can be passed through compression rolls or the like for further processing. Any other suitable method for combining the multilayer film with the substrate surface to be protected can be used, if desired.

Turning now to the level of adhesion produced between the smooth side of the first layer of the improved masking film of the present invention and the substrate surface to be protected, a significant improvement in OSM masking films has been achieved with the improved masking film of the present invention due to its ability to have the adhesion level adjusted according to specific production and application conditions. Adjustment of the adhesion level allows the improved masking film of the present invention to provide a functional level of adhesion in connection with certain substrates at room temperature. Traditional OSM masking films typically require heat to produce the desired level of adhesion. For example, in some applications, latent heat within the substrate's surface to be protected creates a desired adhesion level. However, this will vary from machine to machine in a single process, and even more widely between processes, thus making the use of OSM masking films more difficult and expensive since adjustments in procedure and/or equipment are needed to consistently achieve a desired level of adhesion. Additionally, in some instances where post-production heat-loading processes, including, but not limited to, thermoforming, drape-forming and heat-bending, are employed with masking films which do not provide adequate adhesion at room temperature, the masking film is destroyed upon subsequent attempts to remove the film. Destruction of the masking film occurs in these attempts at removal since the heat-loading has increased the adhesion force between the substrate surface and the masking film to a point where the peel strength needed to remove the masking film exceeds the tensile strength of the masking film itself thus causing the film to tear or break before it will peel away from the substrate.

Adjustment of the adhesion level produced in the present invention is accomplished through the introduction of certain polymer/copolymers into the smooth side of the thermoplastic film. A preferred copolymer associated with the smooth side of the first layer to affect the adhesion level produced is a metallocene catalyzed polyethylene with octene comonomer, such as EG-8200 or PF1140, available from either Dow Chemical Company or DuPont Chemical Company. In such copolymers, it has been discovered that the percentage of octene comonomer influences the level of adhesion of the film to the substrate.

As previously discussed, depending upon the desired application, the polymers copolymer blends may be modified for improved performance. It is noted that embodiments of the present invention masking film including only a primary component exist and are useful as described herein.

Figure 2:
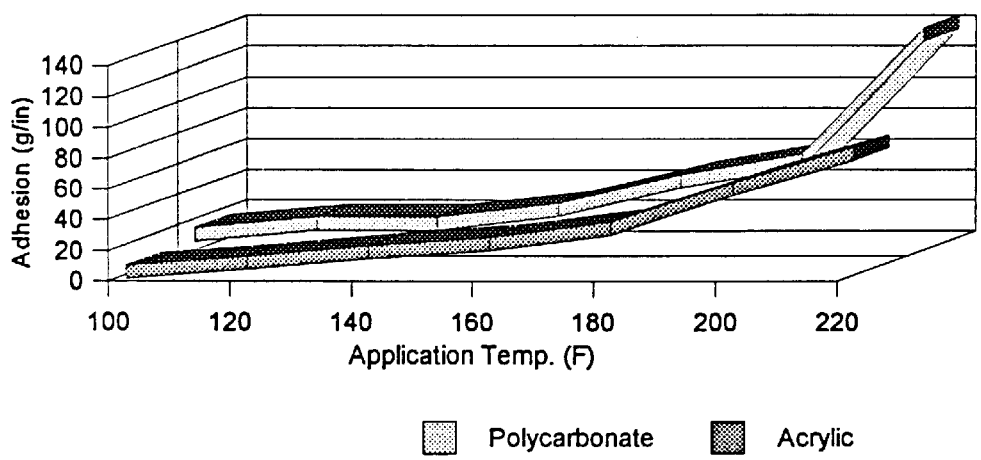
FIG. 2 is a graph depicting peel adhesion values for polycarbonate and acrylic substrates as a function of temperature for 18% octene comonomer component of the masking film.

A further understanding of the improved masking film of the present invention can be obtained by reference to FIGS. 1 and 2. FIG. 1 depicts a graph illustrating the peel adhesion values measured on acrylic and polycarbonate substrates using a masking film as a function of percentage comonomer component of the masking film. FIG. 2 depicts a graph illustrating peel adhesion values to polycarbonate and acrylic substrates as a function of application temperature for a 18% octene comonomer content masking film. The test data were produced and gathered according to the following test procedures.

TEST PROCEDURES

FIG. 1

The smooth side of a coextruded film was made by blending varying percentages of an copolymers with varying percentages of octene comonomers. The resulting film was then masked to a sheet of 1/8" acrylic or polycarbonate by contacting the sheet with the masking film at room temperature and nip rolling the masked sheet to remove any air. The resulting masked sheet was then placed into an oven at various temperatures for a period of 8 minutes for each temperature. The masked sheet was then removed from the oven and nip rolled again. A one inch strip of the masking film was used in a 180° peel test. The peel tests were conducted according to a modified version of ASTM Standard D3330-90. An Instron tensile testing machine was used to measure the force required to peel 4–6 inches of a one inch-wide strip of masking film from the acrylic sheet. The results of the above-identified tests are summarized in FIG. 1

As is demonstrated in the graph of FIG. 1, there is a strong relationship between the percentage comonomer component present and the strength of adhesion produced by the resultant masking film. At a given temperature, the higher the percentage of comonomer, the higher the adhesion to the substrate. As previously mentioned, the addition of other polyethylenes can also adjust the adhesion level produced.

FIG. 2

The smooth side of a coextruded film was made by blending two copolymers with varying percentages of octene comonomer contents in such ratio so as to obtain an overall 18% comonomer content. The resulting film was then masked to a sheet of 1/8" acrylic or polycarbonate by contacting the sheet with the masking film at room temperature and nip rolling the masked sheet to remove any air. The resulting masked sheet was then placed into an oven at various temperatures for a period of 8 minutes for each temperature. The masked sheet was then removed from the oven and nip rolled again. A one inch strip of the masking film was used in a 180° peel test. The peel tests were conducted according to a modified version of ASTM Standard D3330-90. An Instron tensile testing machine was used to measure the force required to peel 4–6 inches of a one inch-wide strip of masking film from the acrylic sheet. The results of the above-identified tests are summarized in FIG. 2. As illustrated in FIG. 2, the peel strength values increase with temperature.

All of the samples tested above were further tested for performance subsequent to undergoing a heat-loading process, such as thermoforming, drape-forming and heat-bending. In the heat-bending procedure, the sample sheet was heated to its softening point using a conventional "strip heater". The softening point was visually inspected by recording the temperature at which the sheet bent over the strip heater to a predetermined angle. The temperature of such bending was at or above 100° C. for acrylic and 150° C. for polycarbonate. Once the sheet was bent to the predetermined angle, the sheet was allowed to cool to maintain the desired angle. For thermoforming, the sheet samples were heated to their glass transition temperature and then forced via vacuum into a desired shape using a vacuum mold.

All of the samples performed well under these heat-loading tests in that the improved masking sheets of the present invention were peeled from the surface after such heat-loading treatment without destruction of the masking film.

The results of the above-identified tests are summarized in Tables I and II below.

TABLE 1

Peel Strength on Polycarbonate Substrate - 3 Hours Post Masking

| Application Temp.(° F.) | Prior Art Adhesion (g/in) | Present Invention Adhesion (g/in) |
|---|---|---|
| 73 | 0–25 | 0–32 |
| 120 | 10–79 | 3–70 |
| 200 | 30 to Destruct | 54–500 |
| After Heat Loading Process | Destructs | Peels |

TABLE 2

Peel Strength on Acrylic Substrate - 3 Hours Post Masking

| Application Temp (° F.) | Prior Art Adhesion (g/in) | Present Invention Adhesion (g/in) |
|---|---|---|
| 73 | 0–25 | 0–25 |
| 120 | 10–70 | 3–36 |
| 200 | 30 to Destruct | 27–250 |
| After Heat Loading Process | Destructs | Peels |

As evidenced by the foregoing, by varying the comonomer content (e.g., blend components and percentages thereof) comprising the improved masking film of the present invention, the level of adhesion produced between the improved masking film of the present invention and the substrate surface to be protected, as expressed by the peel force numbers in the TABLES, is also adjusted. Thus, using the improved masking film of the present invention, it is possible to: (a) produce a desired level of adhesion by selecting the appropriate blend of copolymer and octene comonomer (and/or blend or materials and percentages thereof); and (b) use the improved masking film of the present invention on substrates subject to post-production heat-loading processes (e.g., thermoforming, drape-forming and heat-bending) without destruction of the film upon subsequent removal thereof Importantly, the desired level of adhesion is achieved despite the processing environment and application constraints under which such masking film is used. For example, if the desired application and application context is to functionally adhere the masking film to polycarbonate at room temperature the appropriate copolymer or combination of copolymers can be selected and produced using the improved masking film of the present invention. Even where the masking film is to protect a relatively rough surface, the blend and temperature can be altered to produce the appropriate level of adhesion. With prior art masking films, the processing environment (e.g., equipment placement) and/or desired application temperature were often altered in an effort to obtain the desired adhesion level from the masking film.

The improved masking film of the present invention is thus capable of providing a controlled, adjustable and adequate level of protection to smooth surfaces of substrates by providing a controlled level of adhesion between the masking film and the surface to be protected without the use of corona treatment or an adhesive and their associated disadvantages and under a variety of production and application conditions. The unique advantages of the improved masking film of the present invention allow the film to be modified to meet the desired application and processing environment.

According to the method of the present invention, the above-identified improved masking film is produced employing the steps of: preselecting one or more primary copolymers of the at least one first skin layer of the film, preferably copolymers which include octene comonomer content varying from about 5% to about 30% (hexene and butene comonomers can also be used); predetermining the relative percentages of each constituent element selected. The density of the at least one first layer of polymer can vary from about 0.86 to 0.92 g/cm$^3$; coextruding the at least one first layer with the at least one second layer and the at least one core layer to form a multilayered masking film. The resulting masking film is tailored made to perform (i.e., produce a desired level of adhesion) under a given set of production conditions and environment.

Although preferred embodiments of the invention have been described in the Graphs, Tables and foregoing Detailed Description, it will be understood that the invention is not limited to the embodiments disclosed, but is capable of numerous rearrangements and modifications of parts and elements without departing from the spirit of the invention.

What is claimed is:

1. An improved adhesiveless masking film, comprising:
a first side of the film having a smooth surface that does not have an adhesive coating;
a second side of the film having a rough surface;
wherein the smooth surface of the film ranges in smoothness from 0–60 Ra and the rough surface of the film ranges in roughness from 65–600 Ra;
said smooth surface of the first side of the film adapted for removably adhering to a surface of a substrate when placed in intimate contact with said surface of a substrate;
said first side comprising at least two components preselected to affect the amount of adhesion produced between the smooth surface of the first side and the surface of the substrate at a given temperature;
wherein one of said at least two components comprises a metallocene catalyzed copolymer of ethylene with a comonomer selected from the group consisting of octene, hexene, and butene; and
wherein another of said at least two components is selected from the group consisting of polyolefins (homopolymers and copolymers), polyvinyl alcohol, nylon, polyester, polystyrene, polymethylpentene, polyoximethylene, and blends thereof.

2. The improved adhesiveless masking film of claim 1, wherein the amount of adhesion produced between the smooth surface of the first side and the surface of the substrate at a given temperature is a function of the amount of the one or more components present in the masking film.

3. The improved adhesiveless masking film of claim 1, wherein the masking film comprises at least two layers.

4. The improved adhesiveless masking film of claim 3, wherein the smooth surface is associated with a first layer and the rough surface is associated with a second layer of the masking film.

5. The improved adhesiveless masking film of claim 4, wherein the rough surface comprises one or more of the following: polyolefins (homopolymer or copolymer), styrene, butylene, polyvinyl alcohol, nylon, polyester, polymethylpentene or polyoximethylene.

6. The improved adhesiveless masking film of claim 1, further including additives to improve abrasion resistance, printability, writeability, opacity, cuttability, color or roughness.

7. The improved adhesiveless masking film of claim 1, wherein the first side of the film removably adheres to the substrate at room temperature.

8. The improved adhesiveless masking film of claim 1, wherein the substrate to be protected is selected from the group consisting of polycarbonate, acrylic, PETG, PVC, PET, glass and metals.

9. The improved adhesiveless masking film of claim 1, wherein the first side of the film remains removably adhered to said substrate following subjecting the substrate including the masking film to a heat-loading process.

10. The improved adhesiveless masking film of claim 2, wherein the heat-loading process includes thermoforming, drape-forming or heat-bending.

11. The improved adhesiveless masking film of claim 8, wherein the rough surface of the masking film is matte embossed.

12. The improved adhesiveless masking film of claim 3, wherein the multiple layers of the masking film are coextruded.

13. An improved adhesiveless masking film, comprising:
a first side of the film having a smooth surface that does not have an adhesive coating;
a second side of the film having a rough surface;
wherein the smooth surface of the film ranges in smoothness from 0–60 Ra and the rough surface of the film ranges in roughness from 65–600 Ra
said smooth surface of the first side of the film adapted for removably adhering to a surface of a substrate when placed in intimate contact with said surface of a substrate;

said first side comprising one or more components preselected to affect the amount of adhesion produced between the smooth surface of the first side and the surface of the substrate at a given temperature;

wherein the one or more components is a polyethylenic material including a copolymer selected from the groups consisting of octene comonomers, hexene comonomers, and butene comonomers; and wherein the amount of adhesion produced between the smooth surface of the first side and the surface of the substrate at a given temperature is a function of the amount of the one or more components present in the masking film.

14. The adhesiveless masking film of claim 13, wherein the masking film comprises at least two layers.

15. The adhesiveless masking film of claim 13, wherein the first side of the film removably adheres to the substrate at room temperature.

16. The adhesiveless masking film of claim 13, wherein the first side of the film remains removably adhered to the substrate following subjecting the substrate including the masking film to a heat-loading process.

17. The adhesiveless masking film of claim 16, wherein the heat-loading process includes thermoforming, drape-forming or heat-bending.

18. The improved adhesiveless masking film of claim 1, wherein the smooth surface of the film ranges in smoothness from 0–30 Ra and the rough surface of the film ranges in roughness from 100–300 Ra.

19. The improved adhesiveless masking film of claim 13, wherein the smooth surface of the film ranges in smoothness from 0–30 Ra and the rough surface of the film ranges in roughness from 100–300 Ra.

* * * * *